3,412,610
THERMAL SENSING CIRCUIT
Simon A. Prussin, Los Angeles, Calif., assignor to All-O-Matic Manufacturing Corporation, New Hyde Park, N.Y., a corporation of New York
Continuation-in-part of application Ser. No. 377,223, June 23, 1964. This application Jan. 4, 1967, Ser. No. 607,300
5 Claims. (Cl. 73—362)

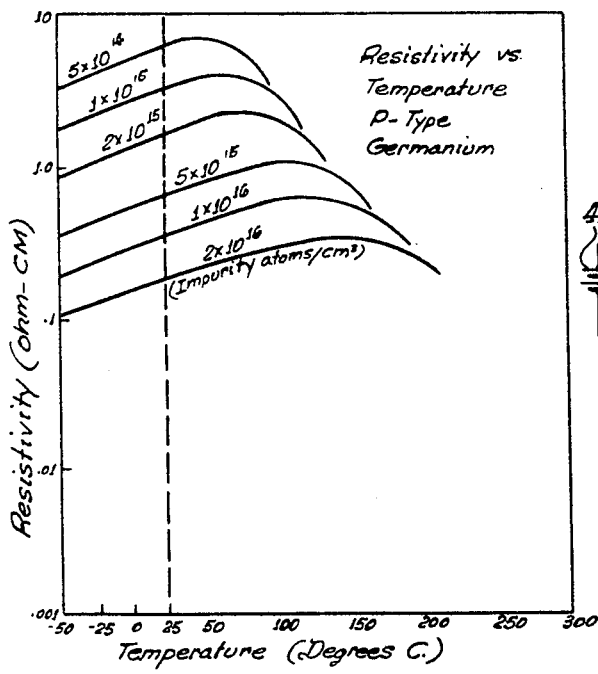
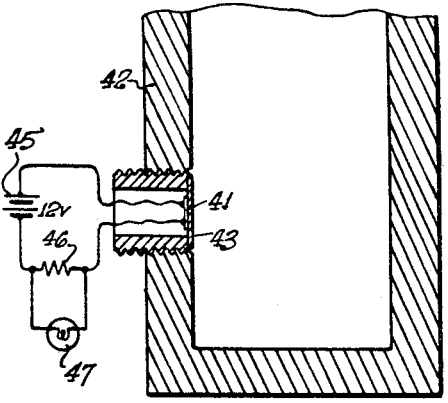
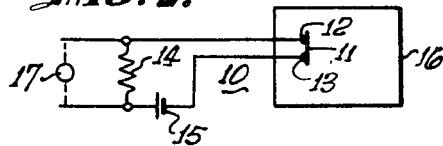
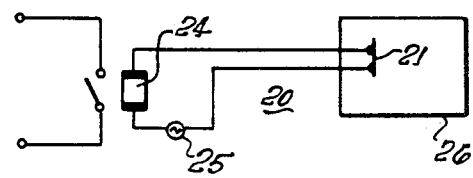
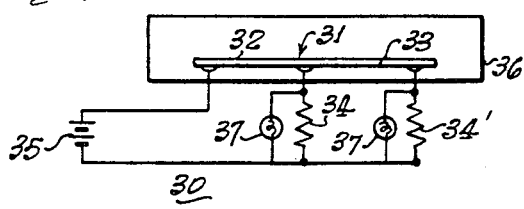
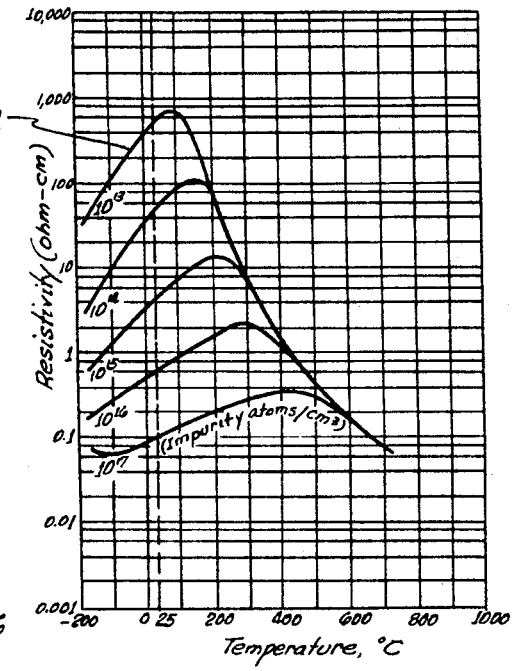
INVENTOR.
SIMON A. PRUSSIN,
ATTORNEYS: MARN & JANGARATHIS, United States Patent Office 3,412,610
Patented Nov. 26, 1968

ABSTRACT OF THE DISCLOSURE

A bistable or multistable thermal sensing circuit is described, wherein the active element is a semiconductor having a positive temperature coefficient of resistivity below a predetermined peak resistivity temperature and a negative coefficient of resistivity above the peak resistivity temperature. When the combination of ambient temperature plus internal current heating exceeds the peak resistivity temperature, a thermal avalanche occurs and control means are actuated. One embodiment is particularly adapted for sensing liquid level and liquid temperature in a container.

---

This invention relates to thermal sensing circuits and, more particularly, to any of such circuits including a body of semiconductive material having a negative temperature coefficient of resistivity above a temperature of peak resistivity, and a positive temperature coefficient of resistivity below such temperature of peak resistivity.

This application is a continuation-in-part of my previously filed application Ser. No. 377,223, filed June 23, 1964, now abandoned, for Thermal Sensing Circuit.

The present invention permits the use of a body of semiconductive material as the temperature sensing component of a bistable or multi-stable thermal switch.

Because of the bistable properties of the present invention sensing element, by properly choosing a particular material possessing these properties with the desired characteristics, the present invention is especially adapted for sensing the temperature of fluid in a container. In this connection it is often necessary to insure that a sufficient quantity of fluid is in the container and it is in this regard that the present invention is peculiarly suited as compared to prior art techniques for temperature sensing of fluids in a container, as will hereinafter be discussed. It is, in addition, capable of sensing the presence of a sufficient quantity of liquid in a container even when such liquid is not subject to heating.

It is an object of the present invention to provide a bistable thermal sensing circuit of high reliability and sensitivity.

Further, it is an object of the present invention to provide a sensing circuit that may be extremely small, and that may be free of radio interference normally associated with the making and breaking of circuits.

In accordance with the present invention, these objects are accomplished by providing a thermal sensing circuit comprising: (1) a sensing body of semiconductive material having a negative temperature coefficient of resistivity above a predetermined temperature, and a positive temperature coefficient of resistivity below such predetermined temperature; (2) an impedance means serially connected to the semiconductive body so as to limit the magnitude of the current passing through the body; and (3) a potential source associated with the serial combination of the body and the impedance means for providing an electrical signal of low magnitude during the time the sensing body of semiconductive material is heated to and/or subjected to temperatures equal to or less than such predetermined temperature, and for providing an electrical signal of relatively high magnitude when the body is heated to and/or subjected to temperatures above such predetermined temperature.

A complete understanding of the invention may be obtained from the following detailed description when read in conjunction with the appended drawing, in which:

FIGURE 1 is a graphical representative of resistivity vs. temperature characteristics of various P-type germanium materials;

FIGURE 2 is a schematic representation of a first embodiment of the present invention which provides an electrical signal that indicates a change of temperature above a particular ambient temperature within a test enclosure;

FIGURE 3 represents a second embodiment of the present invention wherein a change in temperature above a particular ambient temperature within a test enclosure activates a relay switch;

FIGURE 4 represents a third embodiment of the present invention providing a means for detecting a plurality of predetermined changes in temperature within a test enclosure;

FIGURE 5 is a graphical representation of a family of curves showing the relationship of resistivity vs. temperature for various N-type silicon materials; and FIGURE 6 is a sectional schematic view of a portion of a fluid filled container showing another environment employing the present invention.

Referring to FIGURE 1, there is illustrated a plurality of resistivity vs. temperature curves for various semiconductive germanium materials of P-type conductivity having different impurity concentration. Similarly FIGURE 5 shows a plurality of curves for N-type conductivity silicon. Below the temperature associated with the peak resistivity value of any one of these materials, the associated temperature coefficient of resistivity is positive; while at temperatures above such peak resistivity temperature, the temperature coefficient of resistivity is negative. The shape of the resistivity vs. temperature curves, including their peak resitivity values and the temperatures at which such peaks occur, are dependent upon the majority carrier concentration within the semiconductive materials and the nature of the majority carriers (i.e., whether they are electrons or holes). By selecting a semiconductive material having a peak resistivity at a particular temperature, and bonding thereto ohmic contacts that can withstand elevated temperatures to which the body may be subjected, the body of semiconductive material appropriate for use in the circuit of the instant invention is acquired. The dimensions of the body are determined by the requirement of the system or environment into which the semiconductive body is to placed and the resistance requirements of the adjunct instrumentation that may be associated with the sensing circuit.

It will therefore be apparent to one skilled in the art that any type of semiconductive material, either P- or N-type conductivity, and silicon, or germanium or an intermetallic which possesses a definite positive and negative resistivity vs. temperature characteristic may be used.

With regard to FIGURE 2, there is illustrated a bistable thermal sensing circuit 10 which comprises a semiconductive body 11 to which are connected, by means of ohmic contacts 12 and 13, a resistor 14 and a potential source 15. The resistor 14 is serially connected to the body 11 so as to limit the current passing therethrough, while the potential source 15 is connected in series with the resistor 14 and the body 11 for causing the current to pass continuously therethrough. The magnitude of this current is susceptible to a significant change in response to a small temperature variation from a particular temperature within a test enclosure 16.

The operation of the sensing circuit 10 shown in FIGURE 2 may be summarized as follows: at temperatures below the peak resistivity temperature of the semiconductive body 11, the voltage source 15 causes a current to flow through the body which heats the body to a temperature slightly above the ambient temperature within the test enclosure 16. As long as the ambient temperature within the enclosure 16, in combination with the internal heating of the semiconductive body 11 due to the low current passing therethrough, is less than or the same as the peak resistivity temperature of the semiconductive body 11, the current passing through the sensing circuit 10 will remain relatively constant for small changes in the ambient temperature within the enclosure 16. However, when the resistivity of the semiconductive body 11 reaches its peak resistivity value due to the combination of internal current heating of the body 11 and the ambient temperature within the enclosure 16, a small increase in such ambient temperature will decrease the electrical resistance of the semiconductive body. Under this increased ambient temperature, the semiconductive body 11 operates in the temperature range wherein its temperature coefficient of resistivity is negative. Such decrease in resistance of the body 11 results, in turn, in an increased current flow in the current loop comprising the resistor 14, the semiconductive body 11, and the potential source 15. As a consequence of such increased current flow, there is an increase in the internal current heating of the semiconductive body 11, which, because of the negative temperature coefficient of resistivity of the semiconductive body 11, causes a further decrease in the resistance of the body 11, which causes a further increase in the current flow through the current loop 14–11–15. Accordingly, in a very short interval of time, a thermal avalance occurs (i.e., the semiconductive body 11 is brought to a temperature far in excess of the ambient temperature within the test enclosure 16.)

To prevent a runaway current condition upon such thermal avalance, the resistor 14 connected to the current loop 14–11–15 is of such resistance as to limit the magnitude of the current of such loop to well within the operating capacity of the semiconductive body 11.

One method of utilizing the thermal information represented by the increase in electrical signal (current) of the sensing circuit 10 is to connect a voltage responsive device 17 across the resistor 14 for visual observation, or for providing a control function to another circuit. Alternatively, a current responsive device may be connected in the current loop for acquiring such thermal information visually, or for providing a control function to an external arrangement.

FIGURE 3 illustrates an embodiment of the present invention which is adapted to provide a switching function that is dependent upon the ambient temperature within an enclosure 26 surpassing a predetermined value. This embodiment comprises a thermal sensing circuit 20 including: a semiconductive body 21 of the type described abovt with regard to the sensing circuit 10; a magnetic relay 24, a winding of which is serially connected to the semiconductive body 21; and a potential source 25, connected across the body 21 and the winding of the magnetic relay 24 unless the body 21 senses as not to activate the relay 24 unless the body 21 senses a temperature above a predetermined value.

The operation of the sensing circuit 20 is similar to that described above with regard to sensing circuit 10, except that the magnetic relay 24 provides (1) the impedance that prevents a runaway current condition and, also (2) is the means whereby the thermal information is utilized. As to the utilization of the thermal information represented by the magnitude of the current passing through the semiconductive body 21, the magnetic switch 24 retains its open condition until such time as a thermal avalanche occurs. At such time, which is shortly after the semiconductive body 21 has sensed a temperature slightly in excess of a predetermined value, the current passing through the winding of the magnetic relay 24 increases significantly and, thus, activates the relay 24 to its closed condition.

FIGURE 4 illustrates a multiple temperature signalling circuit 30 comprising a semiconductive body 31, a pair of resistors 34 and 34' connected to the body 31, a pair of lamps 37 and 37', each connected across one of the pair of resistors 34 and 34', and a potential source 35 connected across a portion of the body 31 and one of the pair of resistors 34 and 34'. The semiconductive body 31 includes a first portion 32 and a second portion 33 having different impurity concentrations such that the first portion 32 has a peak resistivity value at a temperature below the temperature of the peak resistivity value of the second portion 33. The resistor 34 makes ohmic contact with the semiconductive body 31 at the junction of the first portion 32 and the second portion 33, while the resistor 34' make ohmic contact with the second portion 33 furthest removed from such junction.

The operation of the signalling circuit 30 may be considered an extension of that described with regard to the sensing circuit 20 above. If the ambient temperature within the enclosure 36, in combination with the internal heating of the first portion 32 due to the current passing therethrough, does not exceed the peak resistivity temperature of the first portion 32, the current passing through the resistor 34 and 34' remains relatively low due to the relatively high resistance of the first portion 32. Upon such ambient temperature within the enclosure 36 being increased to a temperature at which only the first portion 32 operates in a range wherein its temperature coefficient of resistivity is negative, a first thermal avalanche occurs. Such occurrenue decreases the resistance of the first portion 32, and increases the current through the resistor 34 so as to bring the lamp 37 to full brilliance. Though the current passing through resistor 34' will also increase, the relatively high resistance of the second portion 33 limits the magnitude of such increase and prevents the lamp 37' from also assuming full brilliance. When the ambient temperature within the enclosure 36 is further increased to a temperature wherein the second portion 33 operates in a range wherein its temperature coefficient of resistivity is negative, a second thermal avalanche will occur. At such time, the current through the resistor 34' shall further increase due to the decrease in the resistance of the second portion 33 and the lamp 37' will assume full brillance. Accordingly, the low brilliance of both lamps 37 and 37' indicates that the ambient temperature within the enclosure 36 is below a first temperature; the full brilliance of only lamp 37 indicates that the ambient temperature within the enclosure 36 is at least equal to said first temperature but below a second temperature; and the full brilliance of both the lamps 37 and 37' indicates that the ambient temperature within the enclosure 36 is above both said first and second temperatures.

As was heretofore mentioned, the present invention is peculiarly suited to the sensing of temperature of liquid in a container and unlike prior art sensing devices, will also determine the possible loss of liquid in the container. This latter characteristic may very well be critical as without it, the sensor is no longer in contact with the liquid and may fail to indicate excessive temperature in the container 42. With reference to FIGURE 6, the temperature of liquid in the container is sensed by the sensing element being inserted at a position within the wall of the container 42 which is below the normal level of the liquid whose temperature is to be sensed. The thermal sensor 41 is mounted on a diaphragm 43. The diaphragm 43 is supported by a threaded member 44 secured within the wall of the container. The diaphragm 43 is preferably a thin member, thus resulting in a low thermal impedance in the direction perpendicular to the wall and to the sensor 41 and offering a high impedance in the longitudinal direction. Thus the temperature of the sensor is substantially unaffected by that of the wall of the container.

The operation of the fluid temperature sensing version of the present invention will now be explained with reference to FIGURE 6. If it is assumed that the fluid whose temperature is being sensed is to be maintained at a temperature below 75° C. (as for example in the engine block of an automobile), a material is chosen wherein the resistivity vs. temperature characteristic is as shown by curve A in FIGURE 5. Therein the peak resistivity occurs at a temperature of 80° C. The temperature of the sensor is slightly higher than that of the liquid with which it is in contact, provided thermal runaway doesn't occur. It is assumed that a 5° C. differential results from the self-heating effect of the sensing element 41 as a result of current flowing therethrough (joule heating) because of the voltage applied thereacross by the battery 45. Four possible situations can exist, as follows:

(1) The liquid level is proper and the liquid temperature is at or below 75° C. In this situation the temperature of the sensor will be at 80° C. or lower. If the temperature of the fluid is at 50° C., for example, the temperature of the sensor 41 will be approximately 55° C. and will remain there as the cooling effect of the liquid will prevent the sensor from rising to a temperature of more than 5° C. above that of the fluid. In this condition, the sensor is operating on the positive slope portion of curve A. If the temperature of the liquid is at 75° C. (its maximum allowable), the temperature of the sensor will be 80° C. (the additional 5° C. being the result of joule heating). Because of the low thermal impedance between the liquid in the container 42 and the sensor 41 through the thickness dimension of the diaphragm the fluid will keep the sensor cool, preventing it from exceeding the liquid temperature by more than 5° C.

(2) The liquid level is proper but the temperature thereof exceeds 75° C. i.e., is at or higher than 75° C. he sensor is now at 81° C. A thermal runaway as described previously for circuit 10 will occur. Such runaway, however, will be severely limited by the cooling effect of the liquid in contact with the sensor. However, because of the reduced resistance of the sensor, more current will flow through it, causing an increase in current flow through the impedance element 46 resulting in the signal element 47 being activated.

(3) The liquid level is proper and its temperature is at or below the 75° C. level but suddenly the liquid level falls below the location of the sensor. The joule heating effect and the absence of fluid cooling will quickly result in thermal avalanche and therefore the signal element will be triggered, even if the liquid and therefore the sensor had prior to the loss of liquid been substantially below 75° C.

(4) The liquid level is below the proper level and therefore below the sensor level when the system is activated. The container temperature is substantially below 75° C., e.g., at 0° C. Upon activation of the system the signal element 47 will be off but as the sensor element 41 is now energized it will very quickly by joule heating and the absence of liquid cooling result in an increase in the temperature thereof until it is at a temperature above 80° C. (the peak of curve A), after which thermal avalanche will occur. Thus despite the fact that the container may still be substantialy below 75° C. the sensor will indicate as if it were above because of the absence of liquid.

While the electrical contacts to the semiconductive material show in all figures to be on one surface of the semiconductive material, this is not a necessary requirement. It is only necessary that two separate areas of the semiconductive material be electricaly coupled in the circuit either directly or through some intermediate means. That is, one contact, for example, may be to one surface of the semiconductive material and the other to the diaphragm which is in contact with the opposite surface.

It will thus be seen that the temperature level to be maintained should be chosen so that it is at or near the peak of the temperature vs. resistivity curve of the semiconductive material, i.e., its slope is at or near 0.

In the automobile this will prevent the engine block and radiator from damage by signalling that sufficient water is not present. The same would also be true in a hot water heater. Thus, it will readily be seen that the present invention will not only sense excessive temperatures of a fluid in a container but will also signal the partial or total loss of fluid therefrom. Present sensing systems, operating on different principles, permit determination of excessive liquid temperature. However, if the liquid level has dropped below point of contact with the sensor, the sensor being in contact with the container walls is effectively insulated from the contained liquid. The reduced liquid is subject to overheating without any indication of the sensor circuit.

When, for example, the automobile has not been in operation and the radiator is cold, the absence of a proper level of coolant should be made immediately obvious. The existence of a positive temperature coefficient below a given temperature means that the initial current flow would be high and the sensing element would be quickly brought to runaway or indicating condition.

In order for this case to occur it is necessary to choose a semiconductive sensing element material whose resistivity is low enough at temperatures substantially below the normal temperature desired so that sufficient current will flow through the sensing element at such low temperature to result in sufficient joule heating thereof to drive the sensor from the positive slope portion of its curve over the peak to the negative slope portion so that thermal avalanche will occur.

It is readily apparent that for this to occur the sensing element need exhibit both a positive slope at low temperatures and a negative slope at temperatures above the maximum desired temperature of the system.

It is to be understood that the above-described circuits are simply illustrative of the application of the principles of the invention. Numerous other circuits may be readily devised by those skilled in the art, which will embody the principles of the invention and fall within the spirit and scope thereof. It is contemplated that such other circuits may be utilized with the above-described semiconductive materials or other semiconductive materials having similar resistivity vs. temperature curves, whether of P or N type conductivity including not only silicon and germanium, but also the intermetallic semiconductors.

I claim:

1. A thermal level sensing circuit comprising: a body of semiconductive material having first and second portions; each portion having a positive temperature coefficient of resistivity for temperatures immediately below a peak resistivity temperature and a negative temperature-coefficient of resistivity for temperatures immediately above said peak resistivity temperature, the second portion having a higher peak resistivity temperature than the first portion; current limiting means serially connected to said body and adapted to limit the magnitude of current passing through said body and comprising a first and second resistor, said first resistor being connected to said body at the junction of said first and second body portions and the said second resistor being connected to the end of said second body portion furthest removed from said first body portion; a potential source connected across said serially connected body and said current limiting means, said source being of such magnitude as to cause a current of relatively constant magnitude to pass through said resistors when the temperature of said body does not exceed a peak resistivity temperature, and to cause an abrupt increase in said current passing through said first resistor upon the temperature of said first body portion exceeding its peak resistivity temperature, and to cause an abrupt increase upon the temperature of said second body portion exceeding its peak resistivity temperature, and a first and second voltage responsive means, each connected across one of said resistors, for indicating whether the temperature of said body is below said first peak resistivity temperature, above said first peak resistivity temperature but below said second peak resistivity temperature, or above both said first and second peak resistivity temperatures.

2. A thermal level sensing apparatus for determining the temperature level of a liquid within a container, comprising: a member inserted within an opening defined in the wall of said container, said member including a thin diaphragm, one of whose surfaces is adapted to be in contact with the liquid within said container; a semiconductive material having a peak sensitivity at a predetermined temperature above which the temperature coefficient of resistivity of such material is negative and below which the temperature coefficient of resistivity is positive; current limiting means serially connected to said semiconductive material and adapted to limit the magnitude of the current that may pass therethrough; said semiconductive element being in intimate thermal contact with the surface of said diaphragm opposite said one surface; and a potential source coupled across said semiconductive material and said current limiting means for causing a current of low magnitude to pass through said current limiting means when said material is subjected to an environment whose temperature, in combination with the temperature generated by joule heating of said material, does not exceed said predetermined temperature, and for causing a current of relatively high magnitude to pass through said current limiting means upon said environment temperature, in combination with said temperature generated by joule heating, exceeding said predetermined temperature.

3. In an apparatus as defined in Claim 7 wherein said predetermined temperature level is chosen at a value such that the slope of resistivity vs. temperature of the semiconductor material is close to 0.

4. A liquid level sensing apparatus for determining whether the level of liquid in a container is above or below the sensor level comprising: a member inserted within an opening defined by the wall of said container below the level at which said liquid level is desired to be maintained within said container; a semiconductive material having a peak resistivity at a predetermined temperature above which the temperature coefficient of resistivity of such material is negative and below which the temperature coefficient of restivity is positive; current limiting means serially connected to said semiconductive material and adapted to limit the magnitude of the current that may pass therethrough; said semiconductive material being disposed proximate the inner wall of said container so as to normally be in thermal contact with the liquid within said container when said liquid is at or above said level, said member being so constructed and arranged as to thermally insulate said semiconductive material from said wall of said container; and a potential source coupled across said current limiting means and said semiconductive material to cause a current of low magnitude to pass through said current limiting means when said material is at a temperature below a given maximum which temperature results from the balance between the joule heat and the cooling effect of the liquid in thermal contact with said semiconductor, and for causing a current of relatively high magnitude to pass through said current limiting means when the cooling effect of the liquid is no longer acting upon said semiconductor material.

5. The apparatus of claim 4, wherein said sensing level apparatus is additionally responsive to sense the temperature of said liquid whereby a current of relatively high magnitude will be caused to pass through said current limiting means when the cooling effect of the liquid is no longer acting upon said semiconductor material due to the level thereof or because said liquid is incapable of cooling said semiconductor material due to the temperature thereof.

References Cited

UNITED STATES PATENTS

| | | | |
|---|---|---|---|
| 2,871,427 | 1/1959 | Tyler et al. | 73—362 |
| 2,929,968 | 3/1960 | Henisch | 73—362 |
| 3,187,193 | 6/1965 | Rappaport et al. | 73—362 |
| 3,222,578 | 12/1965 | Thiele | 73—295 |

S. CLEMENT SWISHER, *Acting Primary Examiner.*

N. B. SIEGEL, *Assistant Examiner.*

UNITED STATES PATENT OFFICE
CERTIFICATE OF CORRECTION

Patent No. 3,412,610                                November 26, 1968

Simon A. Prussin

It is certified that error appears in the above identified patent and that said Letters Patent are hereby corrected as shown below:

Column 2, line 50, "requirement" should read -- requirements --; line 53, after "to" insert -- be --. Column 3, line 59, "about" should read -- above --; line 63, cancel "unless the body 21 senses" and insert -- which is of such magnitude --. Column 4, line 20, "make" should read -- makes --; line 30, "resistor" should read -- resistors --; line 36, "occurrenue" should read -- occurrence --. Column 5, line 38, "75° C.", second occurrence, should read -- 76° C. --; line 39, "he" should read -- the --; line 71, "electricaly" should read -- electrically --. Column 6, line 5, "in the" should read -- in an --; lines 30 and 31, "temperature" should read -- temperatures --. Column 7, line 36, "Claim 7" should read -- Claim 2 --; line 39, "semiconductor" should read -- semiconductive --.

(SEAL)          Signed and sealed this 10th day of March 1970.

Attest:

Edward M. Fletcher, Jr.                        WILLIAM E. SCHUYLER, JR.

Attesting Officer                                  Commissioner of Patents